Sept. 12, 1939. R. B. KERR 2,172,389
REEL ASSEMBLY
Filed Jan. 17, 1938 2 Sheets-Sheet 1

INVENTOR
Robert B. Kerr
BY
ATTORNEY

Sept. 12, 1939.   R. B. KERR   2,172,389
REEL ASSEMBLY
Filed Jan. 17, 1938   2 Sheets-Sheet 2
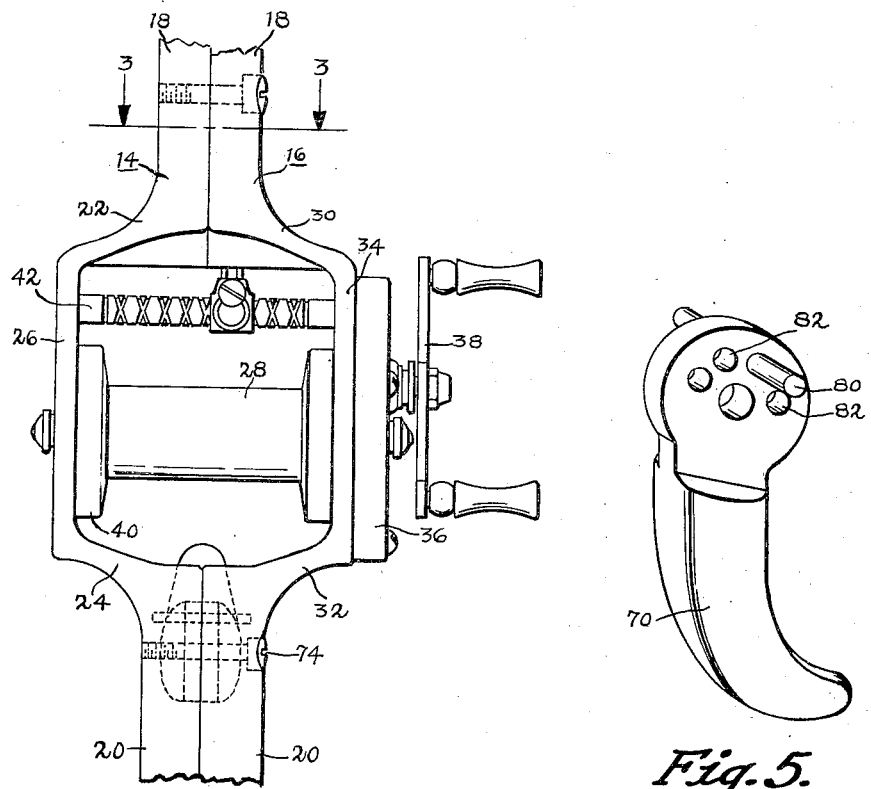
Fig. 4.
Fig. 5.
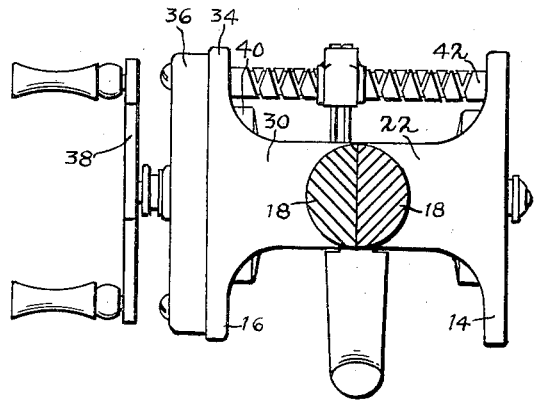
Fig. 3.
Robert B. Kerr   INVENTOR.
BY Henry G. Dybvig
His ATTORNEY.

Patented Sept. 12, 1939

2,172,389

UNITED STATES PATENT OFFICE 2,172,389

REEL ASSEMBLY

Robert B. Kerr, Dayton, Ohio

Application January 17, 1938, Serial No. 185,385

3 Claims. (Cl. 43—20)

This invention relates to a fishing-tackle and more particularly to a combined reel mounting, handle support and rod connecting unit.

An object of this invention is to provide a combined rod connecting unit, handle supporting device and reel brackets.

Another object of this invention is to provide a pair of complementary supports supporting the reel, connecting the rod and the handle together.

Another object of this invention is to provide a reel assembly for a fishing rod that is cheap, efficient, dependable and compact; but at the same time readily accessible.

Another object of this invention is to provide a handle support that may be balanced to provide a proper balance for the selected rod.

Another object of this invention is to provide an adjustable trigger.

Other objects and advantages reside in the construction of parts, the combination thereof and the mode of operation, as will become more apparent from the following description.

In the drawings, Figure 1 is a perspective view of the reel mounting assembly.

Fig. 3 is a cross sectional view taken substantially on the line 3—3 of Figs. 2 and 4.

Fig. 4 is an enlarged fragmentary top plan view of the reel portion.

Fig. 5 is an enlarged view of the trigger.

Figure 1:
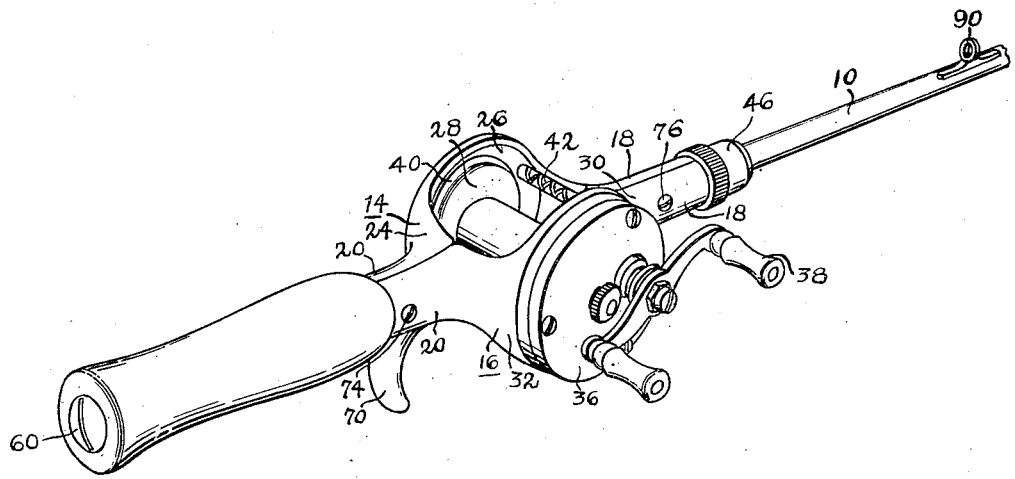

In the past the reels have usually been removably attached to the rods, the reel forming a separate assembly removably mounted. By this arrangement the entire reel assembly projects from one side of the rod, that is, it projects outwardly from the rod. The line follows a path angularly disposed with respect to the longitudinal axis of the rod, as the line is withdrawn from the reel. It is very desirable to have the rod assembly and reel form a compact unit, the line to be substantially aligned with the side of the rod, so that the line may be very easily withdrawn and reeled.

In the preferred embodiment this has been accomplished by providing a unit for interconnecting the handle to the rod, that is provided with brackets supporting the reel with its center substantially traversing the longitudinal axis of the rod. By this arrangement the reel brackets or frame form a connecting unit interconnecting the rod to the handle.

The rod 10 is interconnected to the handle 12 by a pair of bracket members 14 and 16, each terminating in semi-cylindrical portions 18 and 20. The semi-cylindrical portions 18 and 20 of the bracket member 14 merge into outwardly flaring portions 22 and 24, which are joined with an annular disc-like portion 26, which forms a support for the end of the reel 28.

The semi-cylindrical end portions 18 and 20 of the bracket member 16 are each provided with outwardly flaring portions 30 and 32 merging into an annular rim portion 34. The annular portions 26 and 34 rotatably support the reel 28 and the actuating mechanism 36, having a crank 38 for reeling the line. The reel portion 28 and the actuating mechanism 36 are all standard parts now appearing on the market, with the exception of one end of the reel or spool 28, which is provided with a thumb engaging surface 40. In conventional reels or spools the outer flanges of the same are concealed, or practically so, by the frame supporting the reel, so that the only way of manually controlling the spool by the caster or angler is to press the thumb against wound portion of the line or the core of the spool, as the case may be. This is objectionable, in that the effectiveness of the manual engagement of the line on the spool depends upon the distance from the center of the spool to the contacting surface. When the spool is practically full, the manual engagement with the surface of the spool is very effective, whereas when the spool is practically empty, the manual engagement with the line is very ineffective. By the operator pressing the thumb against the surface 40 of the end of the spool, the effectiveness is the same irrespective of the amount of line on the spool. Furthermore, the manipulation of the line on the spool may cause the line to snarl or tangle, thereby interfering with casting. By the operator engaging the rim of the spool, the line is not contacted directly by the hand of the operator.

A suitable leveling rod 42 of any conventional type may extend across the forward portion of the reel.

The semi-cylindrical end portions 18 are provided with a cylindrical bore 44 receiving the end of the rod 10. A nut 46 engaging a threaded portion of the extreme ends of the semi-cylindrical portions 18 clamps the rod is position. The nut 46 is preferably provided with a cylindrical portion 48 merging into a conically shaped recess engaging the tapered ends of the end portions 18, so as to force these against the rod to frictionally hold the rod in position. The ends 18 are preferably slotted near the extreme ends to facilitate clamping of the rod 10 by tightening the nut 46.

The oppositely disposed and rearwardly projecting semi-cylindrical shank portions 20 are provided with a reduced cylindrical portion 50, forming a seat for the hand grip handle 52, which may be made from wood, metal or plastic molding material, and supported upon cylindrical sleeve 54 snugly fitting the cylindrical portion 50.

It is very desirable that the reel and rod be balanced, so that the center of gravity is near or within the hand of the caster. That being the case, the rear end of the handle 52 is loaded by a suitable weight 56, selected to match the weight of the rod used and the demands of the particular user. The handle and the parts associated therewith are held in position by a longitudinally extending bolt 58, threadedly engaging the extreme ends of the semi-cylindrical end portions 20, provided with a head 60 abutting a washer 62 engaging the end of the handle 52 and the weight 56.

In order to facilitate accurate control of the reel and rod, a trigger 70 projects downwardly from the rearwardly projecting shank portions 20 connecting the handle to the reel. The trigger 70 adapted for engagement by the forefinger of the caster may be cast integral with the semi-cylindrical shank portions 20, or the trigger 70, as clearly shown in Fig. 2, may be a separate member seated in a suitable recess 72 located between the shank portions 20. The trigger 70 is held in position with the rear screw 74, cooperating with the forward screw 76, to hold the halves of the reel frame in fixed spaced relation. The screw 74 passes through an aperture in the center of the supporting portion of the trigger 70.

Figure 2:
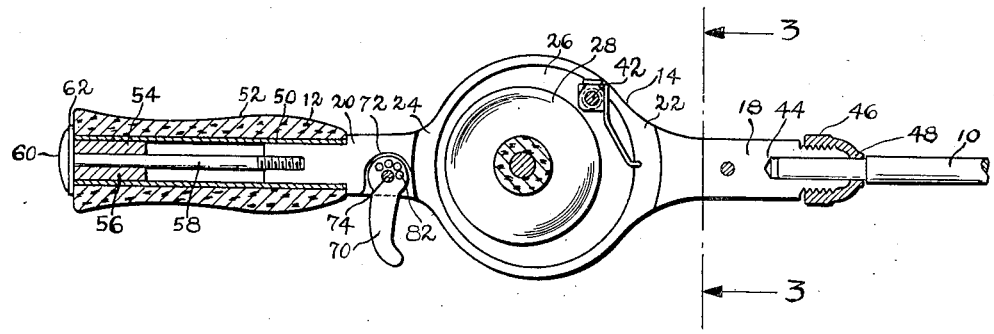
Fig. 2 is a longitudinal cross sectional view.

In the modification disclosed in Fig. 2 the trigger 70 is adjustably mounted for angular adjustment about the screw 74. The trigger 70, as may best be seen by referring to Fig. 5, is provided with a pin 80 engaging one of a series of circumferentially disposed apertures 82 in the trigger 70 and seated in a suitable aperture in the shanks 20. The angular position of the trigger 70 is dependent upon the particular hole selected for the pin 80.

It may be readily seen that the core of the spool or the reel substantially intersects the longitudinal axis of the rod 10, so as to permit the line carried by the rod to extend in a direction substantially parallel to the rod and aligned with the apertures in the bracket 90. This handle and reel assembly may be referred to as a self-contained reel and handle assembly, in that the reel is supported in the handle supporting structure.

By aligning the center of the core so that it substantially intersects the longitudinal axis of the rod and the line withdrawn from the reel being substantially parallel and in contact with the rod, the tendency of the rod to rotate in the hand is greatly reduced when a pull is exerted on the line in any direction, that is, the torque action upon the assembly is greatly reduced, it being far less than if the reel were mounted in offset relation with respect to the rod, as is the case in conventional reels. This arrangement results in greater ease and less effort being required to manipulate the rod.

From the foregoing it may be readily seen that the line may be unreeled with the greatest of ease, practically eliminating all friction and binding action excepting the resistance of the spool itself, which is dependent upon the conventional reel assembly for its function. The assembly is balanced by a suitable weight carried in the handle, which weight is dependent upon the type of rod used and the individual demands of the caster. In the event the line should become tangled or snarled, the reel is accessible from underneath, as well as from the top of the reel assembly. The resulting structure is strong, compact, easily carried and symmetrically disposed, which results in a very desirable fishing-tackle.

Although the preferred modification of the device has been described, it will be understood that within the purview of this invention various changes may be made in the form, details, proportion and arrangement of parts which generally stated, consist in a device capable of carrying out the objects set forth, in the novel parts, combination of parts and mode of operation, as disclosed and defined in the appended claims.

Having thus described my invention, I claim:

1. In a fishing-tackle assembly having a rod, a reel and a hollow handle including a split connecting unit for interconnecting the rod and the handle and for supporting the reel, said unit including a pair of reel supporting bracket members each terminating in semi-cylindrical oppositely disposed end portions cooperating with like end portions of the other member to form cylindrical extensions, the rearward cylindrical extension being provided with a reduced cylindrical portion projecting into the hollow handle and means within the hollow handle for securing the handle to the rearwardly projecting end portions.

2. In a fishing-tackle assembly having a rod, a reel and a hollow handle including a split connecting unit for interconnecting the rod and the handle and for supporting the reel, said unit including a pair of reel supporting bracket members each terminating in semi-cylindrical oppositely disposed end portions cooperating with like end portions of the other member to form cylindrical extensions, the rearward cylindrical extension being provided with a reduced cylindrical portion projecting into the hollow handle, means within the hollow handle for securing the handle to the rearwardly projecting end portions, and means within the hollow handle for balancing the weight of the rod carried by the forwardly projecting end portions.

3. In a fishing-tackle assembly having a rod, a reel and a handle, a connecting unit for interconnecting the rod to the handle, said connecting unit including a pair of reel supporting bracket members terminating in oppositely disposed cylindrical portions one of which projects forwardly to support the rod the other rearwardly from the reel to support the handle, and a spool mounted in said brackets, said spool being provided with a thumb engaging flange substantially flush with the periphery of one of the brackets.

ROBERT B. KERR.